United States Patent
Froeschle et al.

(10) Patent No.: US 8,297,393 B2
(45) Date of Patent: Oct. 30, 2012

(54) MOTOR VEHICLE

(75) Inventors: Mathias Froeschle, Ostfildern (DE); Grant Larson, Ludwigsburg (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 335 days.

(21) Appl. No.: 12/789,923

(22) Filed: May 28, 2010

(65) Prior Publication Data
US 2011/0000727 A1    Jan. 6, 2011

(30) Foreign Application Priority Data
Jul. 1, 2009    (DE) .......................... 10 2009 031 253

(51) Int. Cl.
*B60K 11/08*    (2006.01)
(52) U.S. Cl. ...................................... 180/68.1; 180/68.3
(58) Field of Classification Search ................. 180/68.1, 180/68.2, 903; 296/180.1
See application file for complete search history.

(56) References Cited

U.S. PATENT DOCUMENTS

| | | | |
|---|---|---|---|
| 2,064,380 A * | 12/1936 | Ledwinka | 180/68.1 |
| 2,127,409 A * | 8/1938 | Klavik | 180/68.1 |
| 2,175,527 A * | 10/1939 | Klavik | 180/68.1 |
| 2,529,994 A | 11/1950 | Brezek | |
| 2,585,220 A | 2/1952 | Brezek | |
| 2,969,847 A * | 1/1961 | Komenda et al. | 180/68.1 |
| 3,672,718 A * | 6/1972 | Broyer | 296/181.1 |
| 4,267,895 A | 5/1981 | Eggert, Jr. | |
| 4,275,915 A | 6/1981 | Koritnik | |
| 5,018,779 A | 5/1991 | Lund | |
| 2004/0238246 A1 * | 12/2004 | Ceccarani et al. | 180/68.1 |

FOREIGN PATENT DOCUMENTS

| | | |
|---|---|---|
| DE | 30 17 919 | 11/1980 |
| DE | 4026518 A1 | 3/1991 |
| DE | 19817382 A1 | 10/1998 |

* cited by examiner

*Primary Examiner* — Katy M Ebner
(74) *Attorney, Agent, or Firm* — Gerald E. Hespos; Michael J. Porco

(57) ABSTRACT

A motor vehicle (2) has a roof (3) with two longitudinal roof members (4, 5). Side windows (9) are under longitudinal roof members (4, 5) and fins (12, 13) extend rearward of the longitudinal roof members (4, 5). An outer skin (16) of a rear deck lid (17) is arranged between the fins (12, 13). Air inlet openings (20, 21) are formed in outer sides of the fins (12, 13) adjacent to the side window (9) are connected by a two-channel air duct (23, 24) to an air outlet opening (25, 26) adjacent the outer skin (16) of the lid on the inner side (15) of the fin (12, 13) and to an assembly compartment (RA) for an assembly (AG) of the motor vehicle (2). A rear air deflection device (32) is arranged behind the air outlet opening (25, 26).

15 Claims, 3 Drawing Sheets

MOTOR VEHICLE

CROSS-REFERENCE TO RELATED APPLICATIONS

This application claims priority under 35 USC 119 to German Patent Application No. 10 2009 031 253.6 filed on Jul. 1, 2009, the entire disclosure of which is incorporated herein by reference.

BACKGROUND OF THE INVENTION

1. Field of the Invention

The invention relates to a motor vehicle with a roof that has two lateral longitudinal roof members, side windows under the longitudinal roof members as an extension of the longitudinal roof members, fins rearward of the side windows and an outer skin between the fins.

2. Description of the Related Art

U.S. Pat. No. 4,275,915 discloses a motor vehicle with a roof that has left and right longitudinal roof members and side windows arranged under the longitudinal roof members. Fins adjoin the longitudinal roof members and an outer skin is arranged on a rear deck lid between the fins. The outer skin is offset relative to the vehicle roof. Upright side walls are formed on the inner sides of the fins and extend up from the rear deck lid.

DE 30 17 919 discloses a motor vehicle that has air inlets in sections of the C pillar situated above a belt line of the vehicle. The air inlets lead within the side wall of the motor vehicle to a cooling device.

It is the object of the invention to optimize a motor vehicle of the type described above.

SUMMARY OF THE INVENTION

The invention relates to a vehicle distinguished by the fact that a first component air flow is guided over the outer skin of the lid via an air inlet opening, a two-channel air duct and an air outlet opening situated on the inner side of the fin. A second component air flow is separated off directly from the air flow to supply an assembly compartment. The first component air flow, which is guided over the outer skin of the lid, is used as an incident flow to a rear air deflection device. Thus, the assembly is supplied with the necessary air and the air deflection device develops an optimum effect when the motor vehicle is in operation even on motor vehicles with a fin. The two-channel air duct enables the respective air quantities for the assembly compartment and the air deflection device to be divided according to requirements, depending on how the volume of the air flow is divided into the component air flows. The two-channel air duct can feed process air, e.g. combustion air, directly to the driving engine and/or can provide an air flow for purging the assembly compartment. This applies especially if the assembly is arranged under the outer skin of the lid. In a preferred embodiment, the assembly is the driving engine of the motor vehicle. However, it would also be conceivable to supply some other assembly of the motor vehicle by means of the second component air flow. This assembly could be a cooling device or the like. It would also be conceivable for the assembly supplied with air to be a power supply device of the motor vehicle, such as a battery or the like.

The air inlet opening preferably has two component openings that are connected in an appropriate manner to the two-channel air duct. The component openings can lie in the plane of the air inlet opening. Alternatively, the air duct can branch downstream of the air inlet opening and the component openings can lie within the air duct.

The rear air deflection device preferably is a rear spoiler and the air ducting supplies the rear spoiler with an optimized air flow.

The fins and the two-channel air duct are above the belt line. Accordingly, at least a section of the air duct preferably is at least partly transparent. Thus, the driver can look obliquely rearward out of the interior of the vehicle and through the partially transparent parts of the air duct so that all round vision of the driver of the vehicle is improved. The air duct may have a duct wall that adjoins the side window and at least the duct wall may be at least partially transparent for especially improving vision.

The rear deck lid preferably has an approximately upright side wall in addition to the outer skin of the lid. The upright side wall preferably forms the inner side of the fin and has the air outlet opening. Thus, the otherwise customary path of the seals on motor vehicles with a tailgate can be retained in a simple manner and this path does not need to be relocated into the area of the fins or the like.

The air duct may be a one-piece component or multi-piece component. The two-channel air duct thus continues the air inlet opening and has one ends at the air outlet opening and another end in the assembly compartment. Thus the respective air supply can be provided in a simple manner, especially when the air outlet opening is part of the side wall of the rear deck lid.

The motor vehicle preferably has a driving engine in a mid-engine or rear-engine configuration.

The two-channel air duct preferably has two component ducts, each of which has a component opening of the air inlet opening. The first component duct preferably leads to the air outlet opening, while the second component duct is connected directly to the assembly compartment.

The air duct preferably has a dividing wall that divides the two component ducts from one another. The dividing wall can extend as far as the air inlet opening or can be spaced downstream from the air inlet opening. At least sections of the dividing wall may be at least partially transparent.

A double-walled dividing wall may be provided to allow an optimized route for the component ducts.

The invention will be explained in greater detail below by means of illustrative embodiments with reference to the drawings.

DETAILED DESCRIPTION OF THE PREFERRED EMBODIMENT

Figure 1:
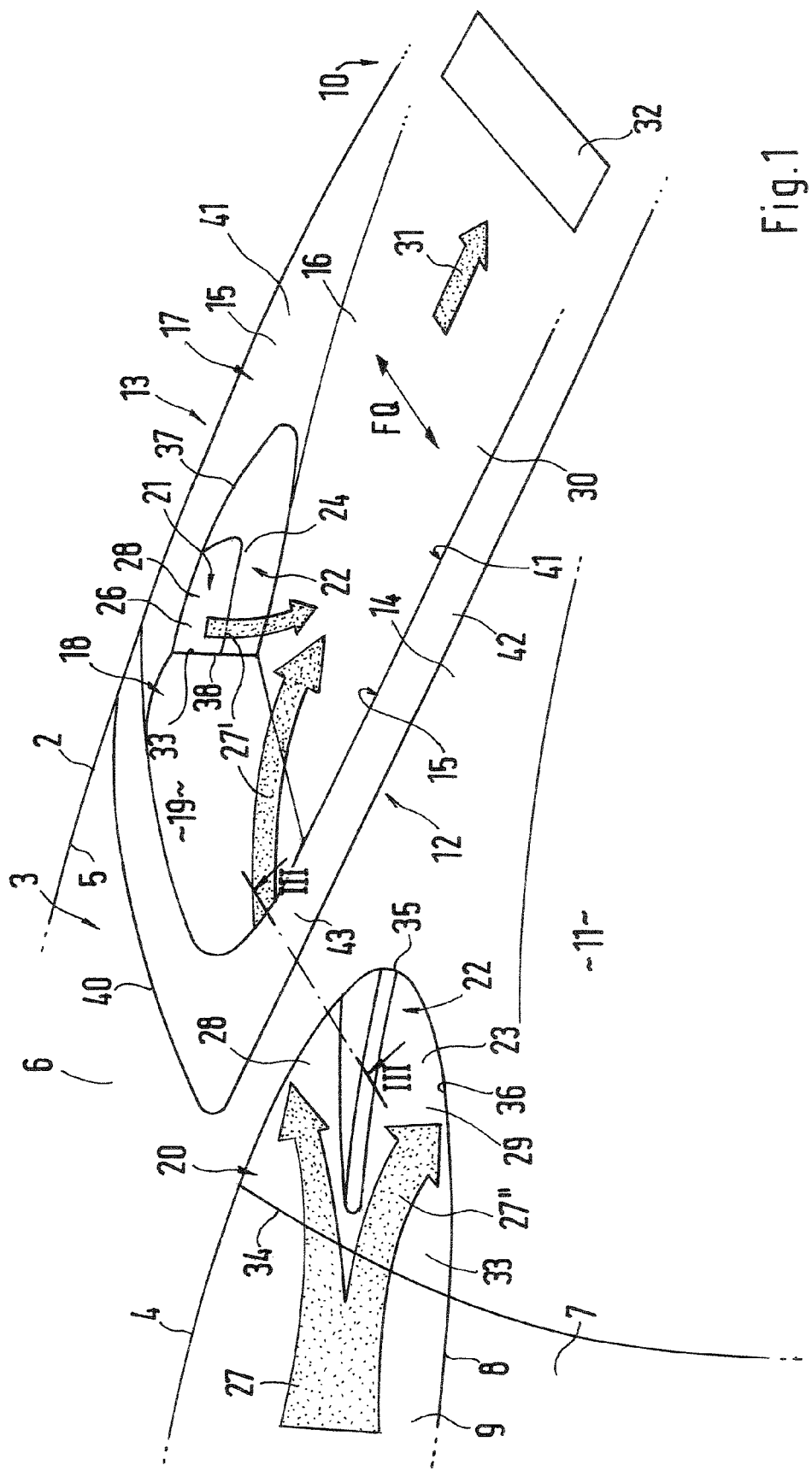
FIG. 1 shows part of a motor vehicle with a vehicle roof, fins and a rear deck lid in an oblique perspective from the rear left side.

FIG. 1 shows part of a body 1 of a motor vehicle 2. The body 1 includes a roof 3 with two spaced apart lateral roof frames or longitudinal roof members 4 and 5. The roof 3 also has a roof panel 6 that extends between the longitudinal roof members 4 and 5. The body 1 has a side door 7 and a belt line 8. The side door 7 has a side window 9 above the belt line 8 and under the longitudinal roof member 4. The vehicle 2 has a rear 10 and the body 1 has a rear side wall 11 behind the side door 7.

Fins 12 and 13 extend from the two longitudinal roof members 4 and 5 toward the rear 10 of the vehicle 1. Each fin 12, 13 is above the belt line 8 and, in plan view, defines a strip-shaped extension of the respective longitudinal roof member 4, 5. The height of each fin 12, 13 decreases toward the rear 10 of the vehicle 2 so that each fin 12, 13 is approximately triangular in side view. Each fin 12, 13 has an outer side 14 and an inner side 15. The inner sides 15 are at a distance from one another in the transverse direction FQ of the vehicle 2, and an outer skin 16 of a rear deck lid 17 is arranged between the inner sides 15 of the fins 12, 13. The outer skin 16 of the lid 17 is offset relative to the vehicle roof 3 to define a step 18 between the outer skin 16 of the lid 17 and the roof panel 6 of the vehicle roof 3. A rear window 19 is arranged within this step 18 and extends approximately vertically between the outer skin 16 of the lid 17 and the vehicle roof 3. The rear window 19 can be attached in a fixed manner to the body 1 or can be part of the rear deck lid 17.

Air inlet openings 20, 21 of an air-ducting device 22 are provided on at least the outer side 14 of at least one of the fin 12 and 13. In the illustrative embodiment, each fin 12, 13 has an air inlet opening 20, 21 adjacent to the respective side window 8. Inwardly directed two-channel air ducts 23, 24 adjoin the respective air inlet openings 20, 21 and lead at least to air outlet openings 25, 26 on the inner sides 15 of the fins 12, 13. The air-ducting devices 22 divert an air flow 27 from each side of the vehicle 2 and guide the air flow 27 into the area between the fins 12, 13. A first component air flow 27' that has passed through the respective air duct 23, 24 and arrives at the respective air outlet opening 25, 26 then flows over the outer skin 16 of the lid 17 in the direction of the rear 10 of the vehicle 2.

Figure 3:
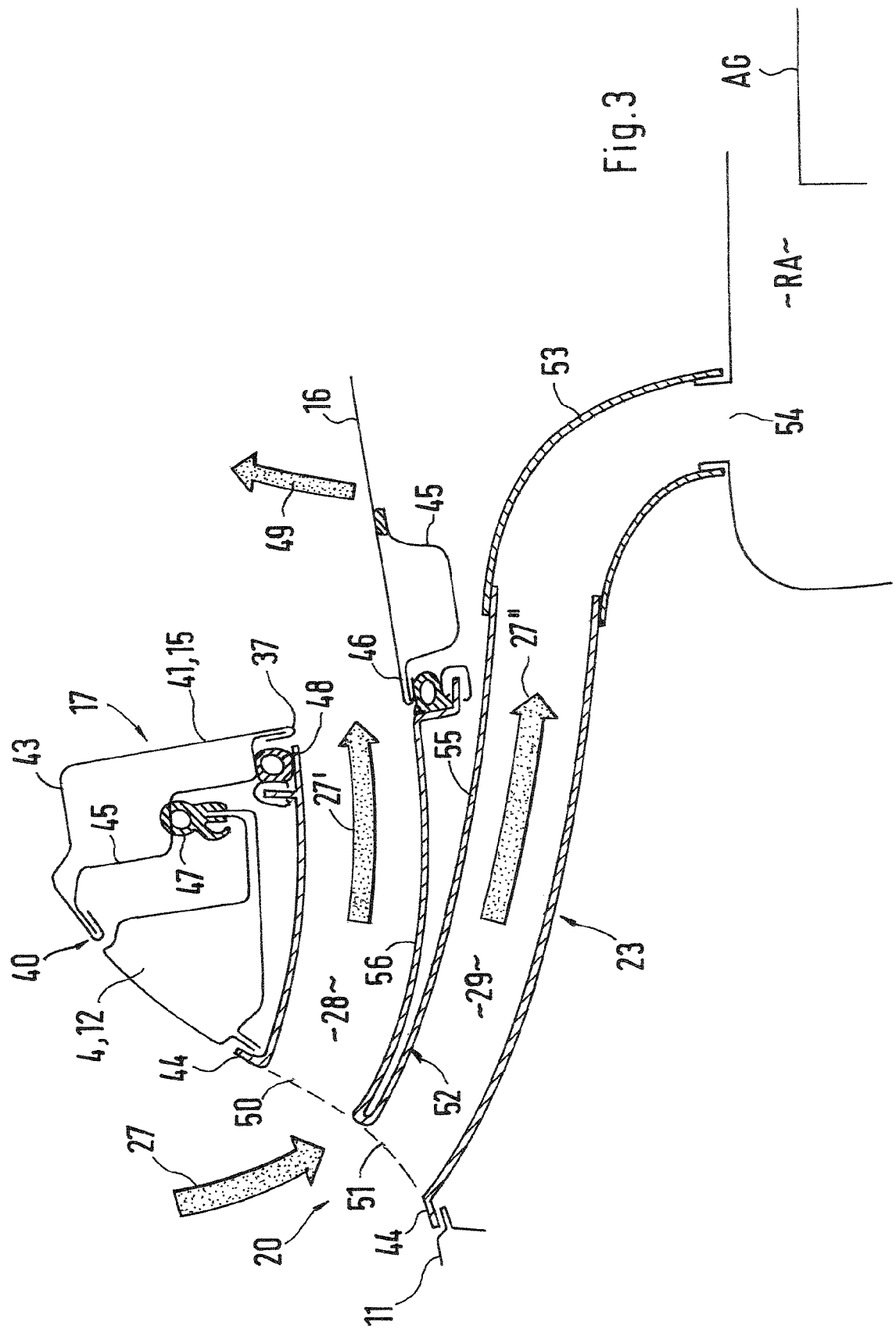
FIG. 3 is a cross-section taken along the line in FIG. 1.

The air duct 23, 24 defines a two-channel or two-flow construction with two component ducts 28, 29. Each component duct 28 of the air ducts 23, 24 leads to the associated air outlet opening 25, 26 and guides the respective component air flow 27' onto the outer skin 16 of the lid 17. The other two component ducts 29 lead to an assembly compartment RA under the rear deck lid 17 (only the left component duct 29 is shown in FIG. 3). A second component air flow 27" thus is directed from the air flow 27, through the component duct 29 and directly into the assembly compartment RA. The first component air flow 27' defines an incident flow 31 that flows across the outer skin 16 of the lid 17 and toward the rear 10 of the vehicle 2 to a rear air deflection device 32 of the vehicle 2. The same applies mutatis mutandis to the air-ducting device 22 associated with the right side of the vehicle, which has the air outlet opening 24. The air deflection device 32 thus is situated behind or downstream of the air outlet openings 25, 26. The air deflection device 32 can be mounted on the outer skin 16 of the lid 17 or downstream on some other part of the body 1. The outer skin 16 of the lid 17 forms a flow-guiding surface 30 for the incident flow 31 between the air outlet opening 25, 26 and the air deflection device 32.

The rear air deflection device 32 is a rear spoiler that can be arranged on or behind the rear deck lid 17. Additionally, the rear air deflection device 32 can be fixed or retractable and extendable and/or, if appropriate, can be adjustable in terms of its slope. The fact that the incident flow 31 is diverted from at least one of the component air flows 27' means that the incident flow to the rear air deflection device 32 can be optimized, although the air flow over the vehicle roof 3 can be disturbed by the step 18.

A duct wall 33 of air duct 23 bounding the air duct 23, 24, directly adjoins the side window 9, as shown in FIG. 1. The air inlet opening 20 therefore is bounded by the rear edge 34 of the side window 9 and a cutout 35 in the body side wall 11 above the belt line 8. At least part of the duct wall 33 can be at least partially transparent so that a driver can look obliquely rearward out of the interior of the vehicle through the duct wall 33. The remaining duct wall 36 of the air duct 23 also can be at least partially transparent, at least sectionwise. Preferably, the duct wall 33 is at least partially transparent between the air inlet opening 20 and the air outlet opening 25, while the remaining duct wall 36 can be opaque. The same applies analogously to air inlet opening 21 and air duct 24. The air outlet opening 26 is bounded by a cutout 37 on the inner side 15 of fin 13 and by an upright lateral edge 38 of the rear window 19.

The rear deck lid 17 is fit into a body cutout 40 that extends beyond the respective body side wall 11 and into the vehicle roof 3. The rear deck lid 17 thus has approximately upright side walls 41 in addition to the outer skin 16. The side walls 41 are situated laterally on the outside to form the inner sides of the fins 12, 13 and thus have the air outlet openings 25, 26 and the cutouts 37. The two upright side walls 41 merge into a frame section 43 that forms the upper side 42 of the fins 12, 13 to define a U-shaped construction that extends as far as the roof panel 6.

Figure 2:
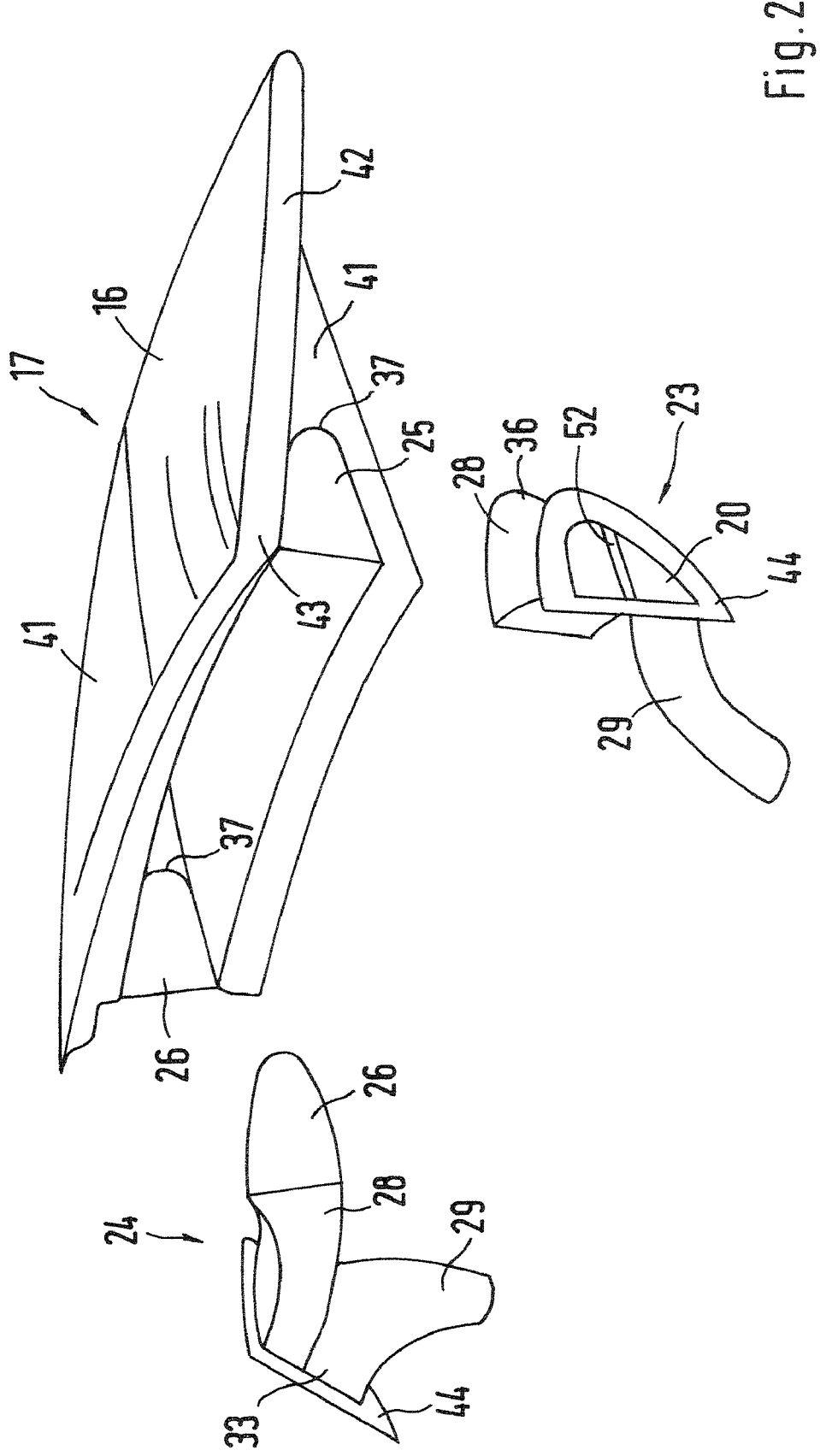
FIG. 2 shows the rear deck lid and air ducts in a detail view.

The air ducts 23 and 24 can be designed as one- or multi-piece subassemblies, as shown in FIG. 2. In particular, plastic components are provided for this purpose. A flange 44 extends all around in the region of the air inlet openings 20, 21 of each air duct 23, 24, as shown in FIG. 3 shows and can rest against the body 2 of the motor vehicle 1. The cross section of the air duct 23, 24 and of the component ducts 28, 29 can have any shaped, e.g. angular or circular. As depicted in the illustrative embodiment, the component duct 28 widens downstream in a funnel shape from the inlet opening 20, 21 to the respective air outlet opening 25, 26. The cross section can be constant or can vary. In particular, the cross section is semi-circular or corresponds approximately to half an oval or ellipse in the region of the air outlet opening and of the air inlet opening. The cross sections of component ducts 28, 29 can be identical or different, depending on what quantities of air are required for the incident flow 31 and for component air flow 27". Moreover, parts that are the same or have the same action are provided with the same reference signs in FIGS. 1 and 2. This also applies to the sectioned representation in FIG. 3, as discussed in greater detail below. The rear deck lid 17 has the outer plate 16, the upright side walls 41 and the upper side 42 forming the peripheral frame 43. The rear deck lid 17 is a twin-shell component comprising the outer plate 16 of the lid 17 and an inner plate 45 of the lid, which are joined in their edge region 46. The longitudinal roof member 4 and fin 12 also are shown in section and are hollow profiles and form sections of the body cutout 40. A first lid seal 47 is arranged between the inner plate 45 of the lid 17 and fin 12 and the longitudinal roof member 4. The first lid seal 47 is mounted peripherally on the body cutout 40. A further sealing device 48 seals the cutout 37 on the inner side 15 of fin 12 with respect to component duct 28. The rear deck lid 17 rests on the sealing devices 47 and 48 in the closed position of FIG. 1, but can be lifted from the sealing devices 47 and 48 to open the lid 17. The lid 17 can be moved by a pivot (not shown) adjacent to the vehicle roof 3, as indicated by an arrow 49 in FIG. 3.

The two component ducts 28, 29 of the two-channel air duct 23 are shown in FIG. 3. However, the following description applies analogously to air duct 24, which is not shown. The component duct 28 has a first component opening 50 of the air inlet opening 20, and the component duct 29 has a second component opening 51. The component openings 50, 51 are arranged one above the other in the illustrated embodiment, but can be one behind the other or one inside the other, e.g. coaxially, with one component opening surrounding the other component opening. Consequently, each component opening 50, 51 is bounded by the duct walls 33, 36 and by a dividing wall 52 that divides the component ducts 28, 29 from one another and extends in the direction of flow within the air duct 23, 24. The two component openings 50, 51 can lie in the plane of the air inlet opening 20, 21, in which the flange 44 lies, or can be set back into the air duct 23 relative to this plane if the dividing wall 52 does not extend into the inlet opening 20. In the illustrated embodiment, the dividing wall 52 extends into the air inlet opening 20.

As mentioned above, the component duct 28 leads from the air inlet opening 20 or its component opening 50 to the air outlet opening 25 over the outer skin 16 of the lid 17. The component duct 29, in contrast, after a section approximately parallel to component duct 28, runs down and then descends farther, by way of a duct elbow 53, in the direction of the assembly compartment RA, which has a supply air inlet 54 connected to component duct 29.

The dividing wall 52 is of double-walled construction, with first and second walls 55 and 56 that are connected to one another in the region of the component openings 50, 51. The first wall 55 forms a duct wall for the second component duct 29, and the second wall 56 forms a duct wall for the first component duct 28. Alternatively, a simple dividing wall 52 can be provided.

The air supply device 22 and the air duct 23 on the left side of the vehicle have been described in the preceding text. The air supply device 22 and the air duct 24 on the right side of the vehicle can be constructed to be functionally identical. However, it would also be conceivable not to provide component air duct 29 of air duct 24 as an air feed with component flow 27', but as an air discharge for the component flow 27' supplied via air duct 23. As an alternative, it would be possible to use one of the component ducts 29 of the two air ducts 23 or 24 to supply process air, e.g. combustion air, for the assembly AG arranged in the assembly compartment RA, while using the other of the component ducts 29 of the air ducts 24 or 23 for purging the assembly compartment RA with air.

What is claimed is:

1. A motor vehicle with a roof having two laterally spaced longitudinal roof members, side windows arranged under the longitudinal roof members, fins extending back from the respective longitudinal roof members, a rear deck lid arranged between the fins and having an outer skin, an air inlet opening being formed in an outer side of at least one of the fins and adjacent to the side window, the air inlet opening being connected by a two-channel air duct having a first part communicating with an air outlet opening on an inner side of the fin adjacent to the outer skin of the lid and a second part communicating with an assembly compartment for an assembly of the motor vehicle, and a rear air deflection device being arranged behind the air outlet opening.

2. The motor vehicle of claim 1, wherein the assembly is a driving engine arranged under the outer skin of the lid.

3. The motor vehicle of claim 1, wherein the air inlet opening has two component openings.

4. The motor vehicle of claim 1, wherein the rear air deflection device is a rear spoiler.

5. The motor vehicle of claim 1, wherein the air duct is at least partially transparent.

6. The motor vehicle of claim 1, wherein the air duct has a duct wall that adjoins the side window.

7. The motor vehicle of claim 1, wherein the rear deck lid has an approximately upright side wall that extends up from the outer skin and forms the inner side of the fin, and wherein the side wall has the air outlet opening.

8. The motor vehicle of claim 1, wherein the air duct is formed by a one- or multi-piece component.

9. The motor vehicle of claim 1, wherein the assembly is a mid- or rear engine in the motor vehicle.

10. The motor vehicle of claim 1, wherein the two-channel air duct has two component ducts, each of component ducts having a component opening of the air inlet opening.

11. The motor vehicle of claim 10, wherein one of the component ducts is connected to a supply air inlet in the assembly compartment.

12. The motor vehicle of claim 10, wherein the air duct has a dividing wall that divides the component ducts and extends to the air inlet opening.

13. The motor vehicle of claim 11, wherein the dividing wall is of double-walled construction.

14. A motor vehicle with a roof having laterally spaced left and right longitudinal roof members, left and right side windows arranged under the respective left and right longitudinal roof members, left and right fins extending back from the respective left and right longitudinal roof members, a rear deck lid arranged between the fins and having an outer skin, left and right air inlet opening being formed in outer sides of the respective left and right fins and substantially adjacent to the respective left and right side window, the air inlet openings each being connected by a two-channel air duct having a first part communicating with an air outlet opening on an inner side of the respective fin adjacent to the outer skin of the lid, each of the two-channel air ducts further having a second part communicating with an engine of the motor vehicle, and a rear air deflection device being arranged behind the air outlet opening.

15. The motor vehicle of claim 14, wherein the engine is arranged under the outer skin of the lid.

\* \* \* \* \*